3,299,181
THERMALLY MODIFIED POLYETHYLENE AND OTHER POLYMERS AND PROCESS FOR PREPARING THE SAME
Harry W. Coover, Jr., Marvin A. McCall, and James E. Guillet, Kingsport, Tenn., assignors to Eastman Kodak Company, Rochester, N.Y., a corporation of New Jersey
No Drawing. Filed May 3, 1960, Ser. No. 26,408
19 Claims. (Cl. 260—897)

This invention relates to a broad class of novel thermally created polymeric products possessing numerous valuable properties. In another aspect the present invention relates to a novel and useful process for "tailoring" polyethylene to form the aforementioned broad class of compounds. More particularly, this invention relates to a method for "tailoring" polyethylene resins to increase their value and versatility by thermally treating polyethylene in the presence of a modifying polymer.

Many methods have been developed for the preparation of polymeric products having properties peculiar to a specific use. For example, prior art workers have attempted to "customize" or "tailor" polyethylene, i.e. to impart certain properties to polyethylene to suit it to particular uses, by such methods as polymerization control, copolymerization, cracking, blending, compounding, cross-linking and powdering. However, except for a few noteworthy methods, the state of the art has not advanced sufficiently to permit the preparation and separation of "tailor-made" polymers from polyethylene having the desired characteristics. It is evident, therefore, that the state of the art will be greatly enhanced by providing a class of "tailor-made" polymers from polyethylene capable of meeting specific requirements. Likewise, a noteworthy contribution to the art will be a method for the preparation of such products.

It is known that polymeric materials can be degraded thermally at temperatures above about 250° C. into lower molecular weight materials. Most polymers degrade into lower molecular weight fragments by one or two or a combination of two mechanisms. By one mechanism the polymer tends to "unzip" splitting off monomer units from the larger polymer molecule. By the other mechanism the polymer tends to break into larger fragments containing many monomer units. In the latter process the splitting may be a random splitting or the breaks may come at certain weak links in the polymer chain. Both of these thermal degradation processes are free-radical type processes. Polymers of monomers having the general structure:

$$CH_2=CR'R$$

where R is an aliphatic or aromatic group such as methyl or phenyl and R' is hydrogen, an aliphatic, cyano, ester or amide group characteristically degraded by an "unzipping" mechanism. Hence, polymers such as polystyrene, polymethyl methacrylate, and polymethylene diethyl malonate when heated at elevated temperatures degrade by an "unzipping" mechanism which yields large quantities of monomer but very little polymeric residue if carried to completion. In this case the molecular weight of the residual polymer is nearly independent of the percent degradation indicating that once the degradation starts in a particular chain the whole chain degrades completely to monomer [see Jellinek, "The Degradation of Vinyl Polymers" (Academic Press) page 68].

We have now made the surprising discovery that when such polymers are degraded in the presence of polyethylene the course of reaction is altered and extended blocks of these polymers apparently become chemically attached to polyethylene chains with only a relatively small amount of monomer being formed in the process. The reason for this unexpected behavior is not known. Not only does the characteristic degradation of polymer change, but the degradation rate of polyethylene is also altered, frequently being much slower than when carried out in the absence of other polymer. Utilizing this discovery, we have been able to "customize" or "tailor" polyethylene. Accordingly, specific desirable characteristics are combined with those of polyethylene by merely making a judicious choice of conditions of thermal treatment and polymeric modifier in thermally treating a mixture of the two.

It is well known in the art that high molecular weight polyethylene has many desirable properties which make it useful as a molding and coating material. For many applications, however, high molecular weight polyethylene has certain undesirable properties which limit its usefulness. For example, considerable difficulty is encountered in printing or dyeing polyethylene, also considerable difficulty is often encountered because polyethylene does not adhere to certain material as well as is desired. It is also known that polyethylene is not very compatible with many resins, waxes, oils and additives used in many coating operations and in many wax and grease formulations, thus limiting its use. In addition, in the paper coating industry considerable difficulty is encountered as a result of high melt viscosities. However, the instant invention now provides new thermally created polymers and a method for their production which substantially overcomes these aforementioned difficulties.

It is, therefore, evident that an object of our invention is to prepare polymeric materials from polyethylene having improved value and versatility.

Another object of our invention is to provide a method for the preparation of such compounds.

Still another object of this invention is to provide a method for producing polymeric products having a wide range of properties ranging from those of low molecular weight waxes to high molecular weight molding and coating materials.

Other important objects of the instant invention will become apparent from the discussion hereinafter.

In accordance with this invention it has been found that a mixture comprising about 5 to about 95%, by weight, of polyethylene and about 95 to about 5% of a modifying polymer, as hereinafter described, can be thermally treated at a temperature within the range of about 260° to about 450° C. for periods of from one minute to several hours to form novel polymeric products having improved clarity, tensile strength, elongation, grease and oil resistance, dyeability of fibers, as well as many other desirable characteristics.

Since any combination from about 5 to about 95% polyethylene and about 95 to about 5% of a modifying polymer can be used in the practice of this invention, there becomes available to the art a process which offers broad possibilities for modification of the properties of polyethylene. Such a process of thermal treatment allows the polyethylene to be "tailored" for many new and specific uses that were not possible using polyethylene alone or mixtures of polyethylene with other polymers or of conventional copolymers of the same composition. This becomes readily apparent from the fact that properties of the new and useful polymers are different from those obtained when a single ethylene polymer is thermally degraded to the same degree. The properties are also different from those of mechanical mixtures of the two thermally degraded polymers and from copolymers having the same over-all composition. Hence, many properties of polyethylene such as hardness and softening point may be either increased or decreased simply by judiciously choosing the right combination of polymeric materials to be thermally treated.

In accordance with this invention polymers having a diversity of desirable characteristics can be obtained. Hence, the products of our invention, in general, will exhibit one or more improved properties including improved grease and oil resistance, dyeability of fibers, heat sealing properties in wax formulations, adhesion to paper, clarity, tensile strength and elongation, which properties are not obtained by normal extrusions or processing temperature controls now employed in the art. In addition, the compatibility of these new thermally created polymers are generally increased in paraffin, oils, resins, soaps and the like. For example, the cloud point which is a measure of compatibility of the new thermally created polymers in paraffin mixtures is considerably lower than that obtained with unmodified polyethylene or a simple mechanical mixture or polyethylene with the same modifying polymer. Moreover, it is possible to form waxes which are emulsifiable by merely making a proper choice of modifier. This is a very significant feature of the invention since, prior to this invention, it was thought necessary to degrade and then oxidize polyethylene to form an emulsifiable wax. Furthermore, the properties of the new thermally created polymers are distinctly different from those obtained by simple mechanical blending or from conventional copolymers of the same over-all composition. In general, these new products give higher melting points than copolymers of similar composition and also show improved flexibility with a minimum of crazing as compared with mixtures having the same percentage composition.

The products of our invention which are obtained as low molecular weight waxes can be used to coat paper to produce a coated material with improved heat sealing properties due to a lowering of the embrittlement tendency possessed by conventional polyethylene waxes or mechanical mixtures of polyethylene wax with paraffin or other natural waxes. Hence, these new low molecular weight thermally modified polymers are useful as substitutes for more expensive vegetable and mineral waxes, as additives to other waxes, polymers and greases, coating materials for paper, cloth, wood, metal and synthetic materials.

According to the practice of this invention, the polymeric modifiers which can be used include homo- or copolymers of specific unsaturated polymerizable compounds containing at least one —CH=C< or more particularly a CH$_2$=C< group. The α-olefins included within this class of monomers include those represented by the formula:

$$CH_2=CRR'$$

wherein R is an aliphatic or aromatic hydrocarbon desirably containing 1 to 20 carbon atoms and R' is hydrogen or methyl.

Additional polymers which can be employed as modifiers in the practice of this invention include homo- or copolymers derived from monomers represented by the following general formulas:

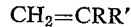

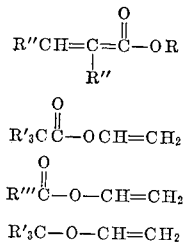

and

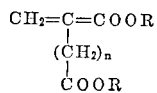

wherein R is a lower alkyl group desirably containing 1 to 8 carbon atoms, R' is hydrogen, halogen, alkyl or a lower alkoxy group desirably containing 1 to 8 carbon atoms, R" is hydrogen or methyl, R‴ is aryl or alkaryl and n is an integer from 0 to 1.

Hence, operative polymeric modifiers include those derived from one or more ethylenically unsaturated polymerizable monomers such as vinyl esters, vinyl ethers, α-β-unsaturated acid esters, olefins, acrylates, methacrylates, malonates and itaconates as exemplified by propylene, butene, isobutene, 3-methyl butene, 4-methyl pentene; hexene-1, heptene, dodecene, pentadiene, butadiene, isoprene, allene, neopentylbutadiene, 2,3-dimethyl butadiene 1,3-hexadiene, n-butyl acrylate, t-butyl methacrylate, styrene, α-methyl styrene, isopropyl acrylate, p-isopropylstyrene, octadecene, vinyl acetate, vinyl allyl ether, vinyl n-butyl ether, vinyl t-butyl ether, vinyl ethyl ether, vinyl isobutyl ether, vinyl isopropyl ether, vinyl methyl ether, vinyl monochloroacetate, vinylnaphthalene, vinylphenanthrene, vinyl propyl ether, vinyl stearyl ether, vinyl methoxy acetate, vinyl 2-methoxyethyl ether, vinyl 2-chloroethyl ether, methylene diethyl malonate, diethyl itaconate, vinyl benzoate and the like.

It is obvious that the polymeric modifiers used in the practice of this invention are quite numerous and represent a wide variety of different materials. In general, however, these modifiers are characterized by a molecular weight of at least 10,000 and a density in the range of about 0.8 to about 1.8.

The ethylene homopolymers used as starting materials in the practice of this invention include conventional polyethylene as well as high-density polyethylene and therefore they will have a density of at least 0.91 and more preferably a density in the range of about 0.91 to about 0.97. The minimum molecular weight will be about 10,000 with an inherent viscosity of at least 0.7.

The characteristics of the new polymers obtained in the instant invention can be varied over a wide range and will, to a large extent, be determined, by the conditions of treatment as well as the particular starting materials employed. In general, however, the products obtained will range from waxes with molecular weights as low as 500 to rigid plastics having molecular weights of 100,000 or higher. Accordingly, the inherent viscosities can range from 0.1 or less to 3.0 or more. The densities of the products will depend upon the densities of the polyethylene and modifier and, in general, will be slightly greater than the weight average of the densities used in the starting mixture before thermal modification.

According to this invention, it is preferred that the thermal modification be effected in the absence of air. This can be accomplished by carrying out the treatment in vacuum or in an inert gas such as nitrogen and the like, in bulk or in the presence of a suitable diluent such as hexane, mineral spirits, benzene, xylene or the like at a temperature which is above the "threshold temperature" for thermal cracking of polyethylene, i.e., above about 260° C. Excellent results are achieved by treating a mixture comprising 5–95%, or more preferably 50–90% polyethylene and 95–5% or 50–10% of modifying polymer under conditions such that the molecular weight of polyethylene, if treated in the absence of modifier, would be decreased at least 10% and preferably 50% or more. In general, it has been found that temperatures within the range of about 260 to about 450° C. and more preferably in the range of about 290 to about 400° C. will achieve the desired results. The time required for the thermal modification will vary from periods of several minutes to several hours depending upon such variable factors as the temperature employed, as well as the molecular weights of the polymers employed, the desired characteristics to be achieved and similar variable factors. Thus, the molecular weight of the product can be changed by variation in the temperature or time of heating, higher temperatures leading to lower molecular weight products. Consequently, the time of heating, in a specific situation, will depend upon the correlation of the several variable factors. However, it has been found that heating periods ranging from about 1 minute to about 4 hours or more, within the temperature range set forth hereinabove, will achieve the desired results.

The thermally created polymers embodying this invention can be prepared by heating in any desired manner using conventional equipment, and the preparation is adapted for either batch or continuous operation. In a continuous process it is desirable to extrude the mixture of polyethylene and modifier in a conventional extruder into a heated zone where it is maintained at the desired temperature for periods of from 1 minute to several hours in order to achieve the desired degree of modification. Likewise, the heating can be carried out in a flowing stream reactor such as a tubular reactor if desired or can be effected in an inert hydrocarbon solvent, either batchwise or in a continuous flowing stream process. Although the preferred method of carrying out the process of this invention involves the use of a thermal treatment at a temperature above the "threshold temperature" it is to be understood that the scope of the invention is not limited thereto since other methods, e.g., mechanical degradation or the application of high shear to a molten mixture, can be employed to effect the desired modification.

The preparation of typical thermally created polymers embodying the invention is illustrated by the following examples, but it will be understood that these examples are merely illustrative and not intended to limit the scope of the invention unless otherwise specified.

*Example 1*

One hundred forty grams of polyethylene and 60 g. of polystyrene were heated under nitrogen. The temperature was gradually raised from 275° to 325° C. and held at this temperature for 4 hrs. Some monomeric or low boiling materials were distilled from the reaction mixture. The resulting polymer was dissolved in hot benzene and poured into warm acetone with vigorous stirring and filtered. The solid was redissolved in hot benzene and reprecipitated in butyl acetate. The remainin solid polymer was separated by filtering. The percent carbon found was 87.0% and hydrogen was 12.6%, which is approximately the value expected for a composition containing 30% styrene. Analysis by infrared indicated the presence of polystyrene groups in the polymer, and the composition was unchanged by successive fractionation, indicating that the new thermally modified material was not a simple mechanical mixture. Pure polystyrene is soluble in butyl acetate and would have been removed from the polyethylene by this treatment if present as a simple mechanical mixture. The product was a hard wax having an inherent viscosity of 0.42 in Tetralin at 100° C. at a concentration of 0.25 g./100 cc. The penetration hardness was 2.0 mm. with a 250 g. weight as compared to 6.3 for a similar polyethylene wax.

*Example 2*

Polyethylene (180 g., I.V. 0.98, density 0.92) was blended with 20 g. of poly-3-methyl butene (crystalline M.P. 245° C.) and heated at 300–350° C. under nitrogen over a period of 1 hr. The product had a greatly increased softening point (crystalline M.P. was in the 130–142° C. range) over that of unmodified polyethylene. This improved property of a higher softening point is a valuable property in polyethylene fibers since higher ironing temperatures can be obtained.

*Example 3*

Polyethylene (160 g., I.V. 0.98, density 0.92) and polyhexene-1 (40 g., I.V. 1.5) were blended together then heated to 180–365° C. for 40 minutes with vigorous stirring. The resulting polymer had an I.V. of 0.7 and much greater flexibility and elongation than unmodified polyethylene. This increased flexibility was accompanied by a minimum of crazing or blushing whereas when a simple mixture of these materials were prepared the material crazed and blushed badly when flexed. A more detailed showing of the improved combination of properties is set forth in Table 1 which follows.

*Example 4*

Polyethylene (200 g., I.V. 1.8, density 0.96) was blended on hot rolls with 10 g. of polyisobutylene. This thoroughly mixed material was then heated to 350° C. under nitrogen with stirring for 20 minutes. The product had an inherent viscosity of 1.2 and a density of 0.952 and could be injection molded to give products of improved toughness and flexibility.

*Example 5*

Polyethylene (400 g., I.V. 1.23, density 0.92) was blended with a copolymer (40 g., I.V. 1.4) containing 4% butene-1 and 96% ethylene. This blend was thermally modified by heating to 320° C. in a 1000-cc., three-neck flask while stirring under 1 mm. pressure for 30 minutes. A small amount of volatile material was removed during this operation. The resulting new thermally modified polymer had an I.V. of 0.90. The properties of this polymer are contrasted with those of the simple blend in Table 2 which follows.

Films of the three resins in Table 2 were extruded from a flat die through a water quench bath situated 1 inch from the die face. The improvement in film transparency and elongation, which is a measure of toughness, illustrates the desirable characteristics of the thermally modified resins as compared to simple blends of the two components.

*Example 6*

Fifteen pounds of cis 1-4-polybutadiene was blended on hot rolls with 85 lb. of polyethylene having a density of 0.918 and an inherent viscosity of 1.23. The blend was then fed to an extruder which had a barrel extension capable of being heated to 450° C. The extension was maintained at 355° C. and the blend extruded through it at a contact time of 11 minutes. The resulting polymer was a soft flexible plastic having an inherent viscosity of 0.92, a stiffness of 11,000 p.s.i. and a tensile strength of 1250 p.s.i. It could be extruded into film, pipe or other shaped objects, and could be injection molded into articles with improved toughness compared to conventional polyethylene.

When the temperature of the barrel extension was raised to 395° C., the product was a soft wax of low melt viscosity with greatly improved toughness. It could be coated onto paper by conventional wax coating equipment to give tough, flexible, moisture-resistant film which could be creased without cracking.

*Example 7*

Polypropylene (1191.75 g., I.V. 2.17) was blended by melting the polypropylene powder with polyethylene (397.25 g. melt index 1.7) while stirring vigorously and then thermally modifying by heating in a three-neck flask under nitrogen with stirring at 320–340° C. for approximately 1½ hr. The resulting product had an I.V. of 0.48, cloud point in paraffin of 97–98° C., and a melt viscosity of 14,000 cps. at 190° C. A mechanical blend (75/25 ratio) identical to that above containing degraded polypropylene (I.V. 0.45) and degraded polyethylene (I.V. approximately 0.49) had a cloud point in paraffin of 108–110° C. The thermally modified wax obtained by the above process was coated on a roll of kraft paper from a melt at 190° C. and quenched rapidly with a chrome plated calender roll. The resulting coating was tough and flexible and could be heat-sealed with conventional heat-sealing equipment. In contrast, paper coated from a mechanical blend of 75% polypropylene wax and 25% polyethylene wax gave a smooth coating, but this coating could not be heat-sealed satisfactorily due to embrittlement of the seal.

*Example 8*

A similar blend of polypropylene and polyethylene (75/25 ratio) as described in Example 7 was thermally modified as described in that example by slowly heating to 365° and maintaining this temperature for 10 to 15 minutes. The resulting product had a melt viscosity of 2300 cps. and a cloud point of 93° C. It had useful wax properties and was more compatible than a simple blend which had approximately the same viscosity but which had a cloud point of 100–102° C.

*Example 9*

Polypropylene (1509.5 g., I.V. 2.17) was blended with polyethylene (79.5 g., melt index 1.7) and the blend thermally modified in the manner described in Example 7 at 320–350° C. for 1¾ hr. The resulting new polymer had an I.V. of 0.47, cloud point in paraffin of 99–100° C., and a melt viscosity of 190° C. of 8600 cps. A similar mechanical blend (95/5 ratio) of polypropylene (I.V. 0.45) and polyethylene (I.V. 0.49) had a cloud point in paraffin of 110–112° C. The improved compatibility of the thermally modified wax allows coating of paper or paper board at lower temperatures to give products with improved surface hardness and gloss.

*Example 10*

Polypropylene (1509.5 g., I.V. 2.03) was blended with polyethylene (79.5 g., melt index 1.7) to give a 95/5 ratio mixture. This mixture was thermally modified in the same manner as described in Example 7 at 340–375° C. for approximately 1 hr. The resulting new product had an I.V. of 0.34 and a melt viscosity of 2700 cps. at 190° C. The cloud point of this thermally modified material was 91° C. which was much lower than that obtained (105° C.) from a comparable mechanical blend of the same viscosity.

*Example 11*

Polypropylene (1350.6 g., I.V. 2.17) was blended with polyethylene (238.4 g., melt index 1.7) to make an 85/15 ratio blend and then thermally modified in the same manner as described in Example 7 at 310 to 350° C. for 1 hr. The resulting new product had a melt viscosity of 14,000 cps. at 190° C. and a cloud point of 101–102° C. A similar blend of polyproylene and polyethylene of comparable viscosity made by simply blending had a much higher cloud point (115–116° C.) showing its lower degree of compatibility.

*Example 12*

Polypropylene (1350.6 g., I.V. 2.02) was blended with polyethylene (238.4 g., melt index 1.7) to give an 85/15 ratio mixture. This mixture was thermally modified in the same manner as described in Example 7 at 370° C. for approximately 1 hour. The resulting new product had an I.V. of 0.28 and a melt viscosity of 3400 cps. at 190° C. The cloud point of this thermally modified polymer was 93° C. The polymer had excellent wax properties and could be blended with paraffin wax to give compatible mixtures.

*Example 13*

Twenty pounds of polypropylene having an inherent viscosity of 1.92 and a conditioned density of 0.91 was blended in hot rolls with 2 pounds of a low-molecular weight polyethylene having an inherent viscosity in Tetralin of 0.34. The resulting blend was then granulated and fed to the hopper of a 1½-in. extruder.

The polymer was extruded at a rate of 14 pounds per hour, which corresponds to a contact time of approximately 5 minutes. The temperature of the extruder increased from 260° C. at the back end to 400° C. at the front. The barrel extension was maintained at 370° C. The resulting polymer had an inherent viscosity of 0.64 and a conditioned density of 0.918 g./ml. The viscosity of the melt was 29,500 cps. at 190° C. This material could be coated onto paper by the conventional hot melt process to give a tough, flexible, high gloss film which could be heat-sealed without embrittlement. A simple mechanical mixture of pure polyethylene of I.V. 0.34 containing polypropylene of I.V. 0.6 gave a smooth tough coating, but gave a brittle heat seal.

*Example 14*

Polypropylene (350 g., I.V. 3.0) was blended with polyethylene (150 g., I.V. 1.3) yielding a blended material containing 30% polyethylene and 70% polypropylene. For comparison purposes, a copolymer was made (I.V. 1.6) containing 30% ethylene and 70% propylene. A portion of the mechanically blended polyethylene and polypropylene (30/70 ratio) was thermally modified at 295° C. for 20 minutes while stirring in a 1000 cc., three-neck flask under 1 mm. pressure. A very small amount of low-boiling material was removed during this operation. The resulting thermally modified material had an I.V. of 1.8.

The data in Table 3 shows clearly the unique properties of the thermally modified polymer over blends and copolymers of the same over-all chemical composition. The simple mechanical blend has lower stiffness, tensile strength, elongation, and less transparency than the thermally modified resin. A copolymer of the same ratio, 30% ethylene and 70% propylene, has much lower stiffness, tensile strength, and transparency than the mechanical blend, or the thermally modified polymer. The desirable combination of properties found in the thermally modified polymer such as high stiffness combined with high tensile strength and high elongation and good transparency makes it an ideal material for film production. This combination of high elongation with high stiffness, high tensile strength, and good transparency is found in the thermally modified material and is not found in any of the above materials.

*Example 15*

One hundred forty grams of polyethylene and 60 g. of polymethyl methacrylate were heated to 285° C. over a period of about 2 hr. under nitrogen. The temperature was then gradually increased to 325° C. and held at this temperature for 3 hr. Some monomeric materials distilled out of the molten polymer. The molecular weight of the resulting polymer was 8,100. Oxygen analysis indicated 1.29% oxygen. This crude material was dissolved in hot benzene and then precipitated with acetone and washed repeatedly with hot acetone to remove any uncombined methyl methacrylate. This operation was continued until the wash acetone contained no soluble polymer. Approximately 50 g. of this new thermally modified polymer containing approximately 1% oxygen was then dissolved in hot benzene on the steam bath. To this solution was added 125 cc. of methyl alcohol. Twenty-five grams of KOH dissolved in an additional 125 cc. of methyl alcohol was then added producing a milky solution which was heated on the steam bath for approximately 1½ hrs., then diluted with water and allowed to stand overnight. The material was decanted, washed with more water then acidified and heated on the steam bath. The product was then filtered and washed free of HCl. The new thermally modified polymer was then melted and titrated. It was found to have an acid number of 4.09, penetration hardness of ½ on 100 g.-scale for 5 sec. or 4½ on 200 g.-scale for 5 sec. This material could be emulsified in water by the usual emulsification technique and was suitable for use as floor polish.

A mechanical blend similar to that above was prepared by mixing 140 g. of thermally degraded polyethylene, molecular weight approximately 8000, with 60 g. of polymethacrylate. The mixture was then heated to 185–210° C. with stirring until a uniform mixture was obtained. At this temperature the resulting product was essentially a mechanical mixture which was demonstrated by the fact that the two components could be completely separated by the process of dissolving in hot benzene and precipitation with acetone as described in Example 15 above. The acetone insoluble fraction gave a material with an acid number of zero after carrying out the hydrolysis step as described above indicating a nonemulsifiable wax as contrasted with the emulsifiable wax obtained by thermal treatment.

A copolymer of ethylene and methyl methacrylate was prepared of approximately the same over-all composition as that of the thermally modified polymer and polymethyl methacrylate. It was hydrolyzed in the same manner as described above to an acid number of 4.2. It formed a poor emulsion and was much softer (penetration of 1.5 on 100 g.-scale for 5 sec.) than the thermally modified material. Thus, the thermally modified material was superior in emulsification and penetration hardness to a copolymer of the same over-all composition.

*Example 16*

In a similar procedure to that described in Example 15, 1000 g. of polyethylene was heated with 500 g. of polyvinyl acetate and blended to give a uniform mechanical blend which was then heated to 300° C. for 1½ hrs. with stirring under nitrogen. The resulting wax product was coated onto paper by the conventional hot melt process to give a tough, flexible, high gloss film which could be heat sealed without embrittlement. A simple mechanical mixture of pure polyethylene and polyvinyl acetate was found to separate out into two phases after standing in the melted state which rendered it unsuitable for this use. The thermally modified material was also found to adhere to the paper better than unmodified polyethylene. The thin film coating of thermally modified polymer was tough and had improved grease retention when compared to a similarly coated polyethylene paper. This was determined by a modification of Army JAN-B-121 test in which turpentine as well as cotton seed oil was used as the test liquid on creased paper.

Other polyvinyl esters such as polyvinyl methoxy acetate and polyvinyl stearate can also be used to prepare similar polymers. These materials also have excellent paper coating properties. The special properties of adherence, grease retention and heat sealability for the thermally modified polymers of this invention are superior to those obtained with polyethylene alone or with mechanical blends of polyethylene and these vinyl polymers.

*Example 17*

In a similar procedure to that described in Example 15, 500 g. of poly-2-ethylhexyl vinyl ether was blended with 500 g. of polyethylene. This mechanical blend was heated with stirring to 300° C. for 2 hrs. The product was a uniform, polymeric material that could be coated onto paper by the conventional hot melt process to give a film that had excellent heat sealing properties. The wax coating could not be separated from the paper as can be done when polyethylene alone is used as the coating material.

Similar runs using polyvinyl 2-methoxyethyl ether and polyvinyl 2-chloroethyl ether instead of the poly-2-ethylhexyl vinyl ether in the thermal treatment also produced excellent coating materials that had excellent adhesion to the paper.

*Example 18*

Polyethylene (400 g.) was thermally modified with 100 g. of polymer obtained by polymerizing methylene diethyl malonate. The thermal treatment or modification was in the 275–300° C. range for 40 min. under nitrogen. The new thermally created polymer was then spun into fibers. These fibers were found to be dyeable by regular dispersed type dyes such as 4-(4'-β-hydroxyethylanilino)-5-nitro - 1,8 - dihydroxy-anthraquinone. Thin films could also be printed when made from this thermally modified material.

*Example 19*

A thermally modified polymer was obtained from polyethylene (495 g. Tenite 800) and 5.0 g. polymeric diethyl itaconate by heating in the 290–300° C. range for ½ hr. The new product showed improved dyeing properties when compared with similarly treated polyethylene alone.

*Example 20*

In like manner 425 g. of polyethylene and 75 g. of polybutyl acrylate were thermally modified by heating at 285–310° C. for ¾ hr. The thermally modified polymer had improved dyeing properties when compared with similarly treated polyethylene alone.

*Example 21*

A copolymer of vinyl acetate and vinyl benzoate was prepared and then blended with polyethylene in a 25–75 weight ratio and heated within a 280–350° C. range for ½ hr. under nitrogen. The new product was homogeneous, did not separate on melting, and showed improved dye absorption when compared with conventional polyethylene fibers and films.

Conditioned density, as used in the above examples, refers to the density determined on a sample which has been annealed in an attempt to obtain maximum crystallinity. A conventional annealing procedure involves placing the sample in a tube, heating under high vacuum or in a nitrogen atmosphere to just below the softening point and allowing the sample to cool slowly.

The unusual combination of physical characteristics possessed by the thermally created products embodying the invention is shown by the data summarized in Tables 1, 2 and 3 which follow. From an examination of this data it is obvious that new thermally created polymeric products are endowed with characteristics which are distinctly different and superior in many respects to the polyethylene products now available.

TABLE 1

| | Stiffness Modulus, p.s.i. | Tensile Yield Strength | Elongation, Percent | Izod Impact −40° C. |
|---|---|---|---|---|
| Polyethylene | 16,000 | 1,450 | 595 | 0.57 |
| 80% Polyethylene 20% polyhexene-1 (blend) | 12,000 | 1,235 | 125 | 0.23 |
| 80% Polyethylene 20% polyhexene-1 (thermally modified) | 9,000 | 1,350 | >700 | 0.98 |

The data in the above table clearly illustrates the unique properties of the thermally modified ethylene polymers over blends of the same over-all chemical composition. The simple mechanical blend has lower stiffness, tensile strength, impact strength and elongation than the thermally modified resins.

TABLE 2

|  | Stiffness Modulus, p.s.i. | Tensile Yield Strength | Elongation, Percent | Film Transparency, in. |
|---|---|---|---|---|
| Polyethylene | 18,000 | 1,500 | 560 | 60 |
| Blend 90% polyethylene and 10% copolymer, 4% butene-1 and 96% ethylene | 20,000 | 1,560 | 160 | 10 |
| Thermally modified 90% polyethylene and 10% copolymer, 4% butene-1 and 96% ethylene | 21,000 | 1,520 | 620 | 140 |

TABLE 3

|  | Stiffness Modulus, p.s.i. | Tensile Strength | Elongation, Percent | Transparency, in. |
|---|---|---|---|---|
| Blend 30% polyethylene 70% polypropylene | 95,000 | 3,200 | 76 | 10 |
| Copolymer 30% ethylene 70% propylene | 5,000 | 1,100 | 700 | 50 |
| Thermally modified blend 30% polyethylene 70% polypropylene | 110,000 | 3,600 | 550 | 170 |

Thus, by means of this invention it is possible to "customize" or "tailor" polyethylene for a specific use by merely making a judicious choice of modifier. According to this invention it is possible to improve one or more of the characteristics of polyethylene to increase its value and versatility. Hence, ethylene polymers available in the prior art can be improved in one or more characteristics such as grease and oil resistance, dyeability of fibers, printability of films, heat sealing properties in wax formulations, adhesion to paper, clarity, tensile strength, elongation, penetration hardness of a wax, compatibility and the like. The improved polymers can, of course, be substituted for conventional polyethylene whenever these improved properties are of significance. For example, because of the need for heat sealing in many packaging applications, the thermally modified waxes of our invention are excellent substitutes for polyethylene now used, since the coating obtained therefrom combines the high strength, toughness, hardness, flexibility, and impermeability of the conventional polyethylene coatings with the ability to be heat sealed.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. The method of tailoring polyethylene to increase its value and versatility which comprises degrading by heating, at a temperature in the range of 290° to about 450° C., for at least one minute, a mixture comprising about 5 to about 95 percent, by weight, of solid non-cross-linked polyethylene resin and about 5 to about 95 percent, by weight, of a modifier selected from the group consisting of (1) a polymer of a compound having the formula:

$$CH_2=CRR'$$

where R is a member selected from the group consisting of aliphatic and aromatic hydrocarbon radicals containing 1–20 carbon atoms, R' being a member selected from the group consisting of hydrogen and methyl, (2) a polymer of an unsaturated polymerizable compound having the formula:

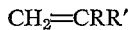

(3) a polymer of an unsaturated polymerizable compound having the formula:

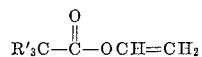

(4) a polymer of an unsaturated polymerizable compound having the formula:

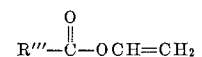

(5) a polymer of an unsaturated polymerizable compound having the formula:

$$R'_3C-O-CH=CH_2$$

and (6) a polymer of an unsaturated polymerizable compound having the formula:

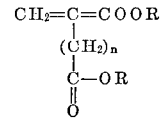

where, in (2), (3), (4), (5) and (6), R is an alkyl radical containing 1–8 carbon atoms, R' is a member selected from the group consisting of hydrogen, halogen, alkyl and alkoxy radicals containing 1–8 carbon atoms, R'' is a member selected from the group consisting of hydrogen and methyl, R''' is a member selected from the group consisting of aryl and alkaryl radicals and $n$ is an integer from 0–1, inclusive.

2. The method of tailoring polyethylene to increase its value and versatility which comprises degrading by heating, at a temperature in the range of 290° to about 450° C., for a period of time in the range of one minute to about 4 hours, a mixture comprising about 5 to about 95%, by weight, of solid non-cross-linked polyethylene resin and about 5 to about 95%, by weight, of a solid modifier selected from the group consisting of (1) a polymer of a compound having the formula:

$$CH_2=CRR'$$

where R is a member selected from the group consisting of aliphatic and aromatic hydrocarbon radicals containing 1–20 carbon atoms, R' being a member selected from the group consisting of hydrogen and methyl, (2) a polymer of an unsaturated polymerizable compound having the formula:

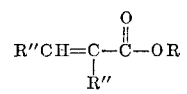

(3) a polymer of an unsaturated polymerizable compound having the formula:

$$R'_3C-\overset{O}{\underset{\|}{C}}-OCH=CH_2$$

(4) a polymer of an unsaturated polymerizable compound having the formula:

$$R'''-\overset{O}{\underset{\|}{C}}-OCH=CH_2$$

(5) a polymer of an unsaturated polymerizable compound having the formula:

$$R'_3C-O-CH=CH_2$$

and (6) a polymer of an unsaturated polymerizable compound having the formula:

$$\begin{array}{c} CH_2=C-COOR \\ | \\ (CH_2)_n \\ | \\ C-OR \\ \| \\ O \end{array}$$

where, in (2), (3), (4), (5), and (6), R is an alkyl radical containing 1–8 carbon atoms, R′ is a member selected from the group consisting of hydrogen, halogen, alkyl and alkoxy radicals containing 1–8 carbon atoms, R″ is a member selected from the group consisting of hydrogen and methyl, R‴ is a member selected from the group consisting of aryl and alkaryl radicals and $n$ is an integer from 0–1, inclusive.

3. The method of tailoring polyethylene to increase its value and versatility which comprises degrading by heating, in the absence of air, at a temperature in the range of 290° to about 450° C., for a period of time in the range of 1 minute to about 4 hours, a mixture comprising about 5 to about 95%, by weight, of solid non-cross-linked polyethylene resin and about 5 to about 95%, by weight, of a solid modifier selected from the group consisting of (1) a polymer of a compound having the formula:

$$CH_2=CRR'$$

where R is a member selected from the group consisting of aliphatic and aromatic hydrocarbon radicals containing 1–20 carbon atoms, R′ being a member selected from the group consisting of hydrogen and methyl, (2) a polymer of an unsaturated polymerizable compound having the formula:

$$\begin{array}{c} O \\ \| \\ R''CH=C-C-OR \\ | \\ R' \end{array}$$

(3) a polymer of an unsaturated polymerizable compound having the formula:

$$R'_3-\overset{O}{\underset{\|}{C}}-OCH=CH_2$$

(4) a polymer of an unsaturated polymerizable compound having the formula:

$$R'''-\overset{O}{\underset{\|}{C}}-OCH=CH_2$$

(5) a polymer of an unsaturated polymerizable compound having the formula:

$$R'_3C-O-CH=CH_2$$

and (6) a polymer of an unsaturated polymerizable compound having the formula:

$$\begin{array}{c} CH_2=C-COOR \\ | \\ (CH_2)_n \\ | \\ C-OR \\ \| \\ O \end{array}$$

where in (2), (3), (4), (5) and (6), R is an alkyl radical containing 1–8 carbon atoms, R′ is a member selected from the group consisting of hydrogen, halogen, alkyl and alkoxy radicals containing 1–8 carbon atoms, R″ is a member selected from the group consisting of hydrogen and methyl, R‴ is a member selected from the group consisting of aryl and alkaryl radicals and $n$ is an integer from 0–1, inclusive.

4. The method of claim 2 wherein the modifier is polypropylene.

5. The method of claim 2 wherein the modifier is polystyrene.

6. The method of claim 2 wherein the modifier is polymethyl methacrylate.

7. The method of claim 2 wherein the modifier is poly-3-methyl-butene.

8. The method of claim 2 wherein the modifier is a copolymer comprising 4 percent butene-1 and 96 percent ethylene.

9. The product obtained by the process of claim 1.

10. The method of claim 2 wherein the modifier is a polymer of a compound having the formula:

$$CH_2=CHR$$

where R is an aliphatic hydrocarbon radical containing 1–20 carbon atoms.

11. The method of claim 2 wherein the modifier is a polymer of a compound having the formula:

$$CH_2=CHR$$

where R is an aromatic hydrocarbon radical containing 1–20 carbon atoms.

12. The method of claim 2 wherein the modifier is a polymer of an unsaturated polymerizable compound having the formula:

$$\begin{array}{c} O \\ \| \\ CH_2=C-C-OR \\ | \\ H \end{array}$$

where R is an alkyl group containing 1–8 carbon atoms.

13. The method of claim 2 wherein the modifier is a polymer of an unsaturated polymerizable compound having the formula:

$$\begin{array}{c} O \\ \| \\ CH_2=C-C-OR \\ | \\ CH_3 \end{array}$$

where R is an alkyl group containing 1–8 carbon atoms.

14. The method of claim 2 wherein the modifier is a polymer of an unsaturated polymerizable compound having the formula:

$$R'CH_2\overset{O}{\underset{\|}{C}}-OCH=CH_2$$

where R′ is an alkyl radical containing 1–8 carbon atoms.

15. The method of claim 2 wherein the modifier is a polymer of an unsaturated polymerizable compound having the formula:

$$R'''-\overset{O}{\underset{\|}{C}}-OCH=CH_2$$

where R‴ is an aryl radical.

16. The method of claim 2 wherein the modifier is a polymer of an unsaturated polymerizable compound having the formula:

$$R'''-\overset{O}{\underset{\|}{C}}-OCH=CH_2$$

where R is alkaryl radical.

17. The method of claim 2 wherein the modifier is a polymer of an unsaturated polymerizable compound having the formula:

$$R'CH_2-O-CH=CH_2$$

where R′ is an alkyl radical containing 1–8 carbon atoms.

18. The method of claim 2 wherein the modifier is a polymer of an unsaturated polymerizable compound having the formula:

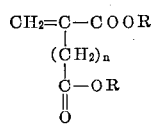

where each R is an alkyl radical containing 1–8 carbon atoms and $n$ is an integer from 0 to 1, inclusive.

19. A method which comprises heating at a temperature betwen 290° C. and about 450° C. in the absence of air a mixture of solid non-cross-linked polyethylene resin with between about 5% and about 10%, by weight, of a homopolymer of a compound selected from the group consisting of isobutylene, styrene and alpha-methyl styrene.

References Cited by the Examiner

UNITED STATES PATENTS

| | | | |
|---|---|---|---|
| 2,400,091 | 5/1946 | Alfthan | 264—115 |
| 2,912,410 | 11/1959 | Cole | 260—889 |
| 2,924,584 | 2/1960 | Wolinski | 260—889 |
| 2,944,040 | 7/1960 | Pollock et al. | 260—889 |
| 2,953,541 | 9/1960 | Pecha et al. | 260—897 |
| 2,956,042 | 10/1960 | Underwood et al. | 260—897 |
| 3,121,070 | 2/1964 | Coover et al. | 260—897 |

SAMUEL H. BLECH, *Primary Examiner.*

L. J. BERCOVITZ, D. J. ARNOLD, *Examiners.*

W. H. SHORT, R. N. COE, *Assistant Examiners.*